United States Patent

[11] 3,610,592

[72] Inventor Thomas P. Murray
 Churchill Borough, Pa.
[21] Appl. No. 845,747
[22] Filed July 29, 1969
[45] Patented Oct. 5, 1971
[73] Assignee United States Steel Corporation

[54] METHOD AND APPARATUS FOR ESTIMATING ERRORS IN PYROMETER READINGS
19 Claims, 4 Drawing Figs.

[52] U.S. Cl. .................................................. 263/3,
 73/355 R, 73/355 EM
[51] Int. Cl. .................................................. G01j 5/06,
 G01j 5/60, G01k 13/06
[50] Field of Search ........................................... 73/355, 355
 EM; 263/3

[56] References Cited
UNITED STATES PATENTS

| | | | |
|---|---|---|---|
| 2,275,265 | 3/1942 | Mead | 73/355 X |
| 2,302,554 | 11/1942 | Kingsbury | 356/43 |
| 2,879,401 | 3/1959 | Chicurel | 73/355 X |
| 3,314,293 | 4/1967 | Schraeder | 73/355 |
| 3,444,739 | 5/1969 | Treharne | 73/355 |
| 3,483,378 | 12/1969 | Murray | 73/355 X |
| 2,438,160 | 3/1948 | Green | 263/3 X |
| 3,358,974 | 12/1967 | Bernard | 263/3 |
| 3,496,033 | 2/1970 | Gilbreath et al. | 263/3 X |

FOREIGN PATENTS

| 1,004,123 | 3/1952 | France | 73/355 |

Primary Examiner—Louis R. Prince
Assistant Examiner—Frederick Shoon
Attorney—Robert J. Leek, Jr.

ABSTRACT: Apparatus for and a method of determining the proper emittance factor for the combined thermal radiation from a body (disposed in a heating cavity defined by the walls of a furnace means and heated to a predetermined temperature by heating means associated with the furnace means) and the reflected thermal radiation from the walls to measure the temperature of the body with a minimum range of temperature error, are disclosed.

The apparatus has sight tube means disposed in one of the walls and in registry with the body, and a body-temperature-measuring pyrometer having a high temperature to emittance factor ratio sensitivity disposed in the sight of tube means. The body-temperature-measuring pyrometer has a first predetermined body emittance factor for the body determined for the body by the ratio method. An emittance correcting pyrometer having a lower temperature to emittance factor ratio sensitivity than the body-temperature-measuring pyrometer is disposed adjacent the body-temperature-measuring pyrometer in the sight tube means. The emittance-correcting pyrometer has a second predetermined emittance factor for the body determined for the body by the ratio method. Mirror means are in said sight tube means for directing a portion or one wavelength band of the combined thermal radiation to the body-temperature-measuring pyrometer and another portion or other wavelength band of the combined thermal radiation to the emittance-correcting measuring pyrometer. The body-temperature-measuring pyrometer is operable to measure the temperature of the body with a first range of stepped emittance factors in the range from the first predetermined body emittance factor to 1.00 to determine a first measured temperature range for the body with a first temperature error range. The emittance-correcting pyrometer is operable to measure the temperature of the body with a second range of stepped emittance factors in the range from the second predetermined emittance factor to 1.00 to determine a range of emittance-correcting factors corresponding to the first measured temperature range. This range of emittance-correcting factors indicates one half-portion of the half-portions defined by the first predetermined emittance factor and the midpoint between the first predetermined emittance factor and 1.00 and the midpoint and 1.00 of the first range of stepped emittance factors in which an adjusted emittance factor for the body-measuring pyrometer lies. The body temperature pyrometer is then set at the midpoint of the one half-portion as such adjusted emittance factor to measure the temperature of the body within the minimum range of temperature error.

The method includes the steps of directing a portion or one wavelength band of the combined thermal radiation to a body temperature-measuring pyrometer having a high temperature to emittance factor ratio sensitivity and a first predetermined body emittance factor the the body as determined for the body by the ratio method and another portion or other wavelength band of the combined thermal radiation to an emittance-correcting measuring pyrometer having a lower temperature to emittance factor ratio sensitivity than the body-temperature-measuring pyrometer and a second predetermined body emittance factor for the body as determined for the body by the ratio method; measuring the temperature of the body with a first range of stepped emittance factors in the range from the first predetermined body emittance factor to 1.00 to determine a first measured temperature range for the body with a first temperature error range; and measuring the temperature of the body with a second range of stepped emittance factors in the range from the second predetermined emittance factor to 1.00 to determine a range of second emittance factors corresponding to the first measured temperature range. The range of second emittance factors for the emittance-correcting pyrometer in the first measured temperature range indicates one half-portion of the half-portions defined by the first predetermined emittance factor and the midpoint between the first predetermined emittance factor and 1.00 and the midpoint and 1.00 of the first range of stepped emittance factors in which an adjusted emittance factor lies. Also included are the steps of setting the body temperature pyrometer at the midpoint of the one half-portion as such adjusted emittance factor, and measuring the temperature of the body with the minimum range of temperature error.

INVENTOR
THOMAS P. MURRAY

By

Attorney

METHOD AND APPARATUS FOR ESTIMATING ERRORS IN PYROMETER READINGS

BACKGROUND OF THE INVENTION

Heretofore, a pyrometer was used to measure temperature, for example, on a metal strip heating line to ensure that the strip heating follows a certain time temperature cycle required for the production of strip with desired metallurgical properties. The pyrometer must be calibrated for a given material to compensate for the relative ability of the material to emit radiation. Such relative emitting power or "emittance factor" is based upon the emitting power of a blackbody radiation source, which is designed as 1.00. For example, at 400° F. aluminum has an emittance factor of 0.04 for radiation of a wavelength of 2 microns, indicating that its emitting power is four-hundredths that of a blackbody radiation source under the same conditions.

Thus, it appears that accurate temperature measurements can be made by calibrating the pyrometer on a blackbody source and adjusting the pyrometer for the emittance factor of the material concerned. In actual practice, however, some applications require that such measurements be made while the material is in a furnace. Thus the pyrometer may record both radiation emitted by the material and also radiation emitted by the furnace walls and reflected from the material. Under these circumstances, the pyrometer should be adjusted by an emittance factor which takes account of both the emitted and reflected radiation. Such emittance factor is of an intermediate value between that of an absolute blackbody source and of the material concerned. In present practice, the pyrometer is provided with a sighting tube for shielding the pyrometer and is adjusted solely for the emittance factor of the material. Since the sighting tube is not completely effective in shielding the pyrometer from radiation from the walls, the measurements are not accurately indicative of the temperature of the material. Thus a requirement exists for the method of determining the amount of radiation from the furnace walls and further adjusting the emittance factor to compensate therefor.

OBJECTS OF THE INVENTION

It is the general object of this invention to avoid and overcome the foregoing and other difficulties of and objections to prior art practices by the provision of a method of and apparatus for determining the temperature of a body, which method and apparatus:

a. compensate for reflected thermal radiation, and
b. accurately measure the temperature of a body with minimum temperature error.

BRIEF SUMMARY OF THE INVENTION

The aforesaid objects of this invention, and other objects which will become apparent as the description proceeds, are achieved by providing an apparatus for and a method of determining the proper emittance factor for the combined thermal radiation from a body, (disposed in a heating cavity defined by the walls of a furnace means and heated to be predetermined temperature by heating means associated with the furnace means) and the reflected thermal radiation from the walls to measure the temperature of the body with a minimum range of temperature error.

The apparatus has sight tube means disposed in one of the walls and in registry with the body, and a body-temperature-measuring pyrometer having a high temperature to emittance factor ratio sensitivity disposed in the the sight tube means. The body-temperature-measuring pyrometer has a first predetermined body emittance factor for the body determined for the body by the ratio method. An emittance-correcting pyrometer having a lower temperature to emittance factor ratio sensitivity than the body-temperature-measuring pyrometer is disposed adjacent the body-temperature-measuring pyrometer in the sight tube means. The emittance-correcting pyrometer has a second predetermined emittance factor for the body determined for the body by the ratio method. Mirror means are in the sight tube means for directing a portion or one wavelength band of the combined thermal radiation to the body-temperature-measuring pyrometer and another portion or other wavelength band of the combined thermal radiation to the emittance-correcting pyrometer. The body temperature pyrometer is operable to measure the temperature of the body with a first range of stepped emittance factors in the range from the first predetermined body emittance factor to 1.00 to determine a first measured temperature range for the body with a first temperature error range. The emittance-correcting pyrometer is operable to measure the temperature of the body with a second range of stepped emittance factors in the range from the second predetermined emittance factor to 1.00 to determine a range of second emittance factors corresponding to the first measured temperature range. The range of second emittance factors indicates which one half-portion of the half-portions defined by the first predetermined emittance factor and the midpoint between the first predetermined emittance factor and 1.00 and the midpoint and 1.00 of the first range of stepped emittance factors in which an adjusted emittance factor lies. The body temperature pyrometer is set at the midpoint of the determined one half-portion as such adjusted emittance factor to measure the temperature of the body with the minimum range of temperature error.

The method includes the steps of directing a portion or one wavelength band of the combined thermal radiation to a body-temperature-measuring pyrometer having a high temperature to emittance factor ratio sensitivity and a first predetermined body emittance factor for the body as determined for the body by the ratio method and another portion or other wavelength band of the combined thermal radiation to an emittance-correcting pyrometer having a lower temperature to emittance factor ratio sensitivity than the body-temperature-measuring pyrometer and a second predetermined body emittance factor for the body as determined for the body by the ratio method; measuring the temperature of the body with a first range of stepped emittance factors in the range from the first predetermined body emittance factor to 1.00 to determine a first measured temperature range for the body with a first temperature error range; and measuring the temperature of the body with a second range of stepped emittance factors in the range from the second predetermined emittance factor to 1.00 to determine a range of second emittance factors corresponding to the first measured temperature range. The range of second emittance factors indicates which one half-portion of the half-portions defined by the first predetermined emittance factor and the midpoint between the first predetermined emittance factor and 1.00 and the midpoint and 1.00 of the first range of stepped emittance factors in which an adjusted emittance factor lies. Also included are the steps of setting the body-temperature-measuring pyrometer at the midpoint of the one half-portion as such adjusted emittance factor, and measuring the temperature of the body with the minimum range of temperature error.

BRIEF DESCRIPTION OF THE SEVERAL VIEWS OF THE DRAWINGS

For a better understanding of this invention reference should be had to the accompanying drawings, wherein like numerals of reference indicate similar parts throughout the several views and wherein.

Although the principles of this invention are broadly applicable to the measurement of temperature of a body, this invention is particularly adapted for use in conjunction with the measurement of a body temperature by compensating for reflected thermal radiation and hence it has been so illustrated and will be so described.

DETAILED DESCRIPTION

Figure 1:
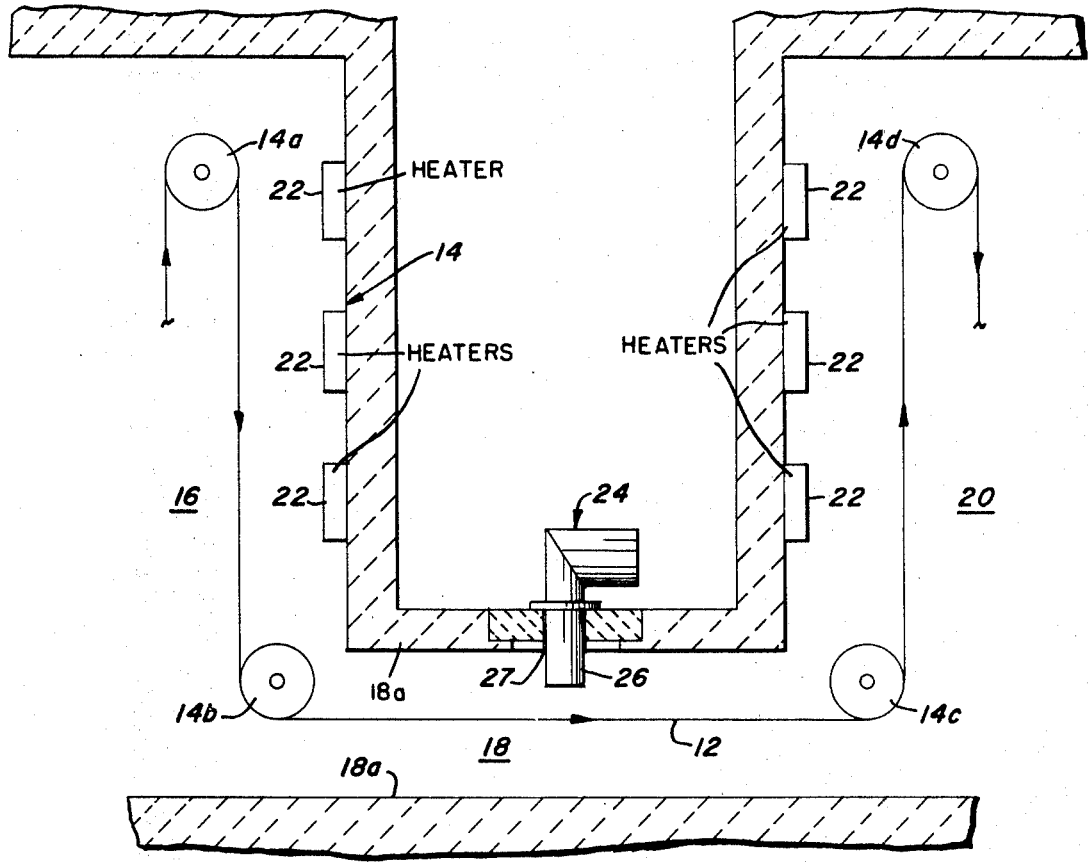
FIG. 1 is a fragmentary schematic side elevational view of a heating furnace utilizing the apparatus of this invention.

With specific reference to the form of this invention illustrated in the drawings and referring particularly to FIG. 1, a low-carbon steel strip is indicated generally by the reference numeral 12.

Referring to the heating means, such as the continuous annealing furnace 14 shown in FIG. 1, the strip 12 is guided by rollers 14a, 14b, 14c, 14d through a heating zone 16, tunnel 18 (FIGS. 1, 2) and holding zone 20 of the furnace 14. The furnace 14 has walls 18a (FIGS. 1, 2) of a suitable refractory, such as silica brick, which define the tunnel or heating cavity 18. The strip 12 is disposed in the heating cavity 18 by the rollers 14b, 14c. Heating means, such as the radiant heaters 22 (FIG. 1) of the U-type radiant tube type manufactured by General Electric Company, Schenectady, New York, are associated with the furnace 14 for heating the body or metal strip 12 to a predetermined temperature, such as about 1,200° F.

Apparatus 24 of this invention communicating with the heating cavity 18 determines the proper emittance factor to be used by the apparatus 24 to compensate for the reflected thermal radiation from the walls 18a (in the case where the temperature of the walls is less than the temperature of the body) so that the apparatus 24 will measure the temperature of the strip 12 with a minimum range of temperature error.

APPARATUS 24

Figure 2:
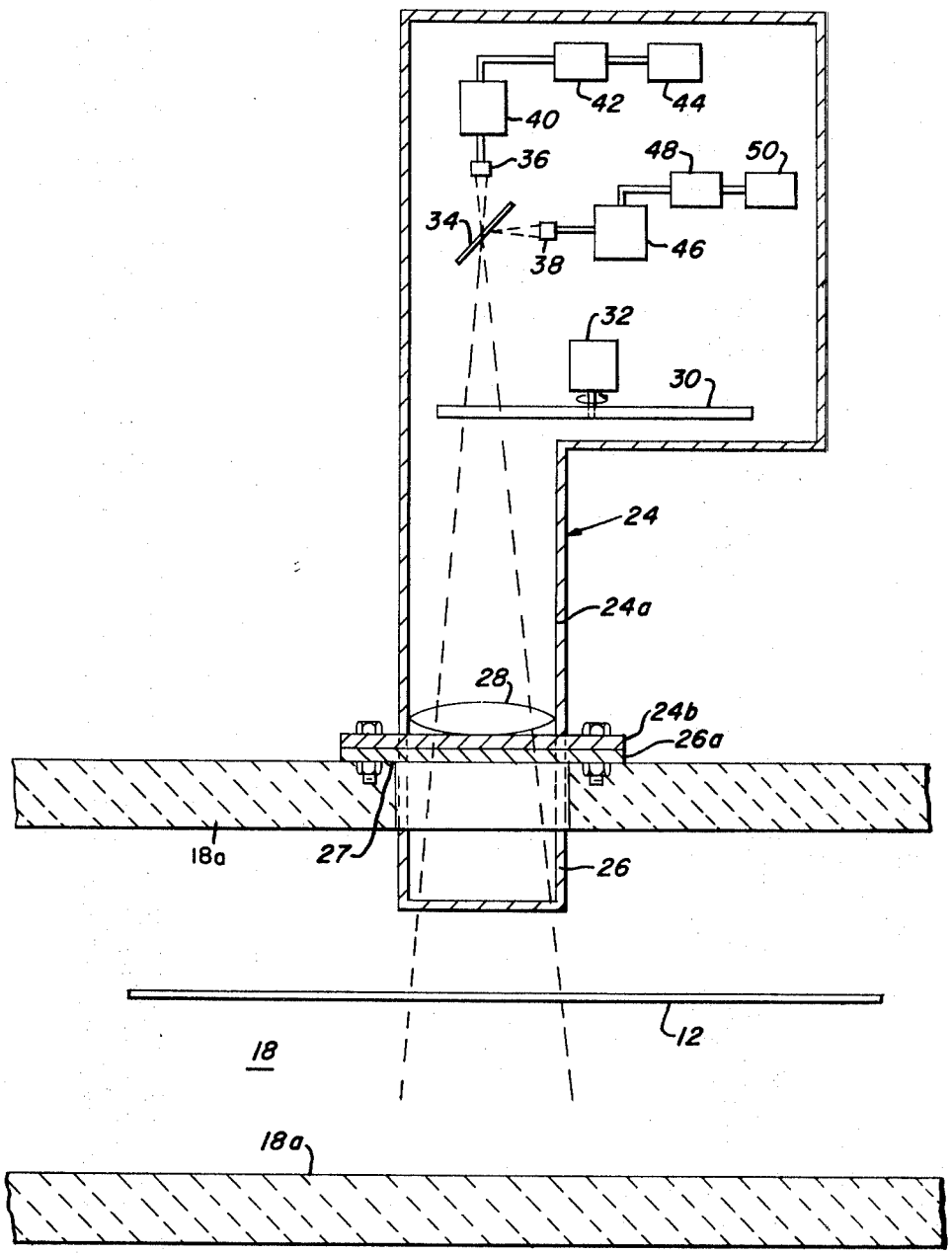
FIG. 2 is an enlarged side elevational view of the apparatus of this invention.

Referring to FIGS. 1, 2, the apparatus 24 (having a housing 24a, FIG. 2) has sight tube 26 (FIGS. 1, 2) disposed (by its flange 26a (FIG. 1) on a housing flange 24b of the housing 24a) in aperture 27 (FIGS. 1, 2) in one of the walls 18a in registry with the strip 12. A lens means, such as the lens 28 (FIG. 2) having about a 2-inch diameter, about a 3-inch focal length, of the double convex type manufactured by General Electric Company, Schenectady, N.Y., is disposed in the sight tube 26 to focus the combined thermal radiation, as indicated by the dotted lines in FIG. 2, on a chopping means, such as the chopper 30 (FIG. 2) and driven by the motor 32 to periodically interrupt such combined thermal radiation at a fixed frequency.

Mirror means, such as half silvered mirror 34 is also disposed in the sight tube 26 for directing a portion or wavelength band of the alternating combined thermal radiation to a body-temperature-measuring pyrometer, such as a silicon cell detector 36 mounted in the sight tube 26, and of the type PIN-10, for example, manufactured by United Detector Technology, Santa Monica, California, and another portion or other wavelength band of the alternating combined thermal radiation to an emittance correcting pyrometer, such as the lead sulfide detector 38 of the Ektron type, manufactured by Eastman Kodak Company, Rochester, New York.

The silicon cell (temperature-measuring) detector 36 responds primarily to radiation of wavelengths of about 10,000 A. Lead sulfide (emittance-correcting) detector 38 responds primarily to radiation of wavelengths of about 22,000 A.

Figure 4:
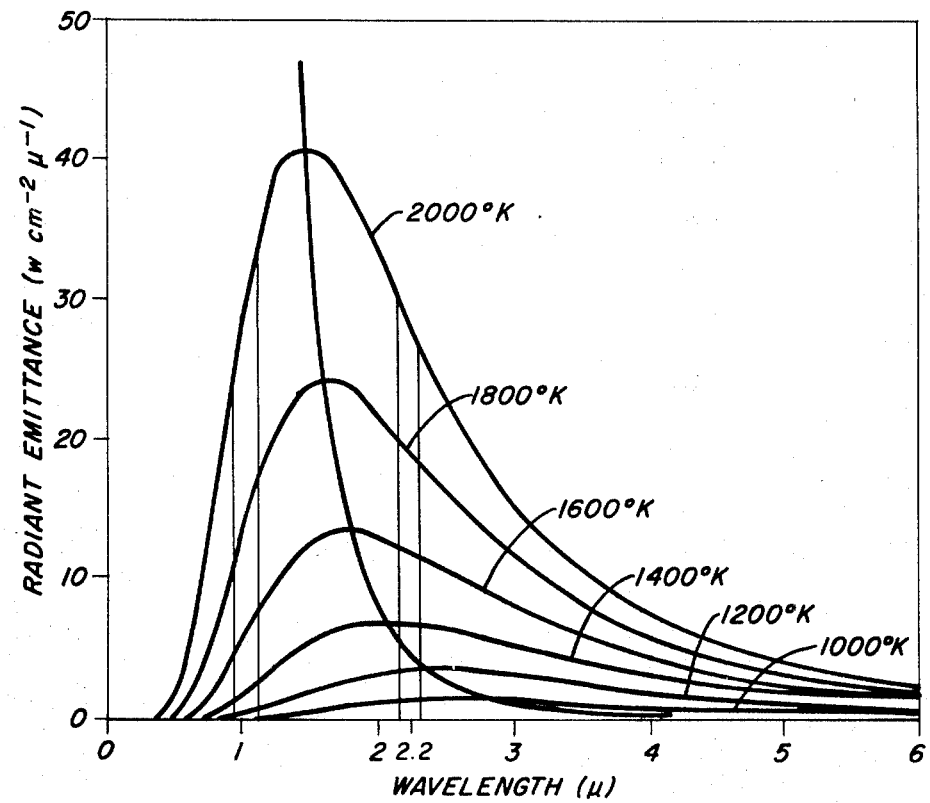
FIG. 4 is a graph showing the variation of Spectral Distribution of energy emitted by a blackbody for a number of different temperatures for the body-measuring pyrometer and for the emittance-correcting pyrometer.

FIG. 4 shows (in relative fashion only) how the radiation of different wavelengths emitted by a blackbody varies as the temperature of the blackbody changes. Note that the shorter wavelength radiation (at 1.00 micron) increases much more steeply with temperature than does the radiation at 2.2 microns. This has the effect of making the shorter wavelength (temperature-measuring) pyrometer 36 much less sensitive to target emittance than the longer wavelength (emittance-correcting) pyrometer 38. For example, if the actual emittance factor of the body 12 is twice the factor for which either of the pyrometers 36, 38 is adjusted, this means the energy emitted by the target is twice the supposed value. However, it may require only a 50° F. change in temperature for the radiation output of the 1.00-micron (temperature-measuring) pyrometer 36 to double, so the supposed temperature will be in error by 50° F. For the second (emittance-correcting) pyrometer 38 doubling of the output corresponds to a much greater temperature change, and the pyrometer 38 will be in error by this greater amount.

This can be shown mathematically as follows.

In using a pyrometer to measure temperature, if the field of view of the instrument is filled with radiation, then the instrument responds to the radiance of the target. For a target of emittance $\epsilon$, the radiance $(J_\lambda)$ follows the modified Planck Law:

$$(1) \qquad J_\lambda = \frac{1}{\pi} \frac{\epsilon C_1 \lambda^{-5}}{e^{C_2/\lambda T} - 1}$$

(watts/cm.$^2$=steradian per unit wavelength interval)

where:
$\epsilon$ = emittance of the target
$e$ = natural base of logarithms
$\lambda$ = wavelength of detector response in meters
$C_1 = 3.7415 \times 10^{116}$ watt-meter$^2$
$C_2 = 1.4388 \times 10^{12}$ meter—°K.

Where $e^{C_2/\lambda T} \gg 1$ for $\lambda$ and $T$ both small, Planck's Law may be replaced to a good approximation by Wien's Law:

$$(2) \qquad J_\lambda = \frac{1}{\pi} C_1 \lambda^{-5} e^{-C_2/\lambda T}$$

with the same meaning for the symbols.

If the output of a pyrometer is plotted versus temperature, then over short segments of the curve (that is, limited temperature ranges) the curve may be represented by an equation of the form $$(3) \qquad E = \epsilon a T^n$$

where $E$ is the pyrometer output, $T$ is the absolute temperature, $\epsilon$ is the target emittance, and $a$ and $n$ are constants.

To determine the relative effects of the two variables, emittance and temperature, on the pyrometer, both sides of this expression are differentiated:

$$(4) \qquad dE = aT^n d\epsilon + n\epsilon a T^{n-1} dT$$

Dividing the left side by $E$ and the right side by $\epsilon a T^n$ (which equals $E$), $$(5) \qquad \frac{dE}{E} = \frac{aT^n d\epsilon}{\epsilon a T^n} + \frac{n\epsilon a T^{n-1} dT}{\epsilon a T^n}$$

which simplifies to $$(6) \qquad \frac{dE}{E} = \frac{d\epsilon}{\epsilon} + n \frac{dT}{T}$$

Multiplying both sides of the equation by 100 results in
Percent change in $E$ = Percent change in $\epsilon + n$ (percent change in $T$).

If the pyrometer has been calibrated for a certain fixed value of $\epsilon$ and this value then increases by 10 percent, the temperature would then be 10 percent/$n$ lower for the same output of the detector. For example, if $n$ were 10, the temperature would be only 1 percent lower than the calibrated value for the same output on the detector. If $n$ were 2, the temperature would be 5 percent lower, and so forth. This means that to minimize temperature errors due to variations in emittance, the pyrometer should follow a high-power law, if this can be arranged.

If the optical and electronic characteristics of the detector are considered as being represented by an instrumental constant $k$, the pyrometer output can also be taken as equal to $J_\lambda$ (from equation 2) multiplied by this constant:

(7)
$$E = \frac{K}{\pi} \epsilon C_1 \lambda^{-5} e^{-C_2/\lambda T}$$

or (8)
$$E = K_1 \epsilon e^{-C_2/\lambda T} \quad \left( K_1 = \frac{K}{\pi} C_1 \lambda^{-5} \right)$$

then (9)
$$dE = K_1 e^{-C_2/\lambda T} d\epsilon + \frac{C_2}{\lambda T^2} K_1 \epsilon e^{-C_2/\lambda T} dT$$

If we divide Equation 9 by Equation 8

(10)
$$\frac{dE}{E} = \frac{d\epsilon}{\epsilon} + \frac{C_2}{\lambda T} \frac{dT}{T}$$

By comparison with the equivalent expression (6), $n = C_2/\lambda T$. This shows that a pyrometer will have a high "power" and a relatively low sensitivity to emittance variations for $\lambda$ and $T$ both small. $T$ is not a matter of choice but is determined by the application. For a given $T$, $\lambda$ should be as small as possible.

The emittance factor or low-carbon steel strip 12 at 1,200° F. was determined (in the laboratory by the ratio method and on apparatus described in Applicant's U.S. Pat. No. 3,483,378 issued Dec. 9, 1969, and assigned to the same assignee) on the silicon cell temperature-measuring detector 36 to be 0.42 and on the lead sulfide (emittance-correcting) detector 38 to be 0.25.

This apparatus has a frame having a location adapted to receive one of a blackbody and a heated body. Heating means are connectable to the one body to heat the one body to a predetermined temperature and to maintain the one body at the predetermined temperature. Chopping means are on the frame adjacent the one body for converting thermal radiation from the one body into an alternating radiation signal. Thermal radiation detection means are on the frame at a predetermined distance from the location so that the target area of the one body fills the field of view of the thermal radiation detection means. The thermal radiation detection means is operable to measure the alternating radiation signal from the one body by converting the alternating radiation signal into an alternating electrical signal. The other body of the blackbody and heated body is disposable in the location. The heating means is connectable to the other body to heat the other body to the predetermined temperature and to maintain the other body at the predetermined temperature. The chopping means is operable to convert thermal radiation from the other body into an alternating radiation signal. The thermal radiation detection means is operable to measure the alternating radiation signal from the other body by converting the alternating radiation signal from the other body into an alternating electrical signal so that the ratio of the alternating electrical signal from the heated body to the alternating electrical signal from the blackbody is the emittance of the heated body at the predetermined temperature.

The silicon cell (temperature-measuring) detector 36 has a high temperature to emittance factor ratio sensitivity such as $E36 = K_1 \epsilon t^{12}$ where $E$ = voltage in millivolts
$K_1$ = constant for the detector 36
$\epsilon$ = emittance factor
$t$ = temperature °F.

Figure 3:
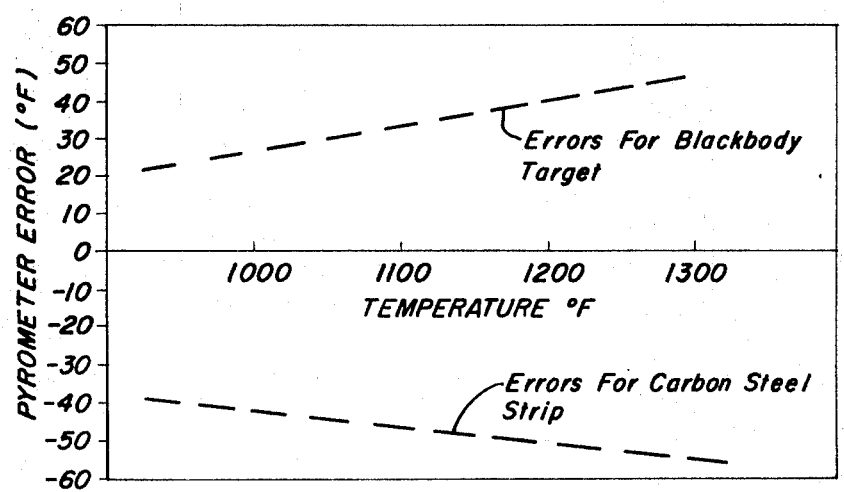
FIG. 3 is a graph of temperature versus temperature error for a silicon cell pyrometer calibrated for 0.70 emittance factor for a blackbody target having an emittance of 1.00 and a low-carbon steel strip having an emittance of about 0.42.
Figure 3:
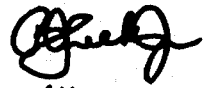

The error limit of ±50° F. for the silicon cell (temperature-measuring) detector 36 was determined (FIG. 3) for 0.70 emittance for (1a) blackbody target and (2) low-carbon steel strip having the 0.42 emittance. An emittance of 0.70 is about halfway between the emittance 0.42 and 1.00 thus giving a ±0.30 or ±40 percent error. Since the ratio of the emittance error to temperature error is 12/1, a ±40%/12 = ±3.5% temperature error exists. 1,200° F. +463 = 1,663° Rankin. 3.5% of 1,663° Rankin gives a ±50° error.

The lead sulfide (emittance-correcting) detector 38 has a lower temperature to emittance factor ratio sensitivity as evidenced by $E38 = K_2 \epsilon t^5$
where $E38$ = voltage in millivolts
$K_2$ = constant for the detector 38
$t$ = temperature °F.
$\epsilon$ = emittance factor As shown in FIG. 2 the first alternating electrical signals from the silicon cell (temperature-measuring) detector 36 are amplified by a first preamplifier 40 of the DP-5A type manufactured by Barnes Engineering Company, Stamford, Conn., filtered by a filter 42 of the type 252 manufactured by White Instruments, Inc., Austin, Tex., and recorded on a recording means such as the strip-chart recorder 44 of the type G manufactured by Leeds and Northrup Company, Philadelphia, Pa.

In like manner the second alternating electrical signals from the lead sulfide (emittance-correcting) detector 38 are amplified by a second preamplifier 46 of the type DP-5A manufactured by Barnes Engineering Company, Stamford, Conn., filtered by a second filter 48 of the type 252 manufactured by White Instruments, Inc., Austin, Tex., and recorded on a strip-chart recorder 50 of the type G manufactured by Leeds and Northrup Company, Philadelphia, Pa.

OPERATION

The silicon cell (temperature-measuring) detector 36 measures the temperature of the strip 12 with the first range of stepped emittance factors in the range from the first predetermined body emittance factor (i.e. 0.42 to 1.00) as shown in table I below:

TABLE I

| Emittance Setting | Temperature Reading, ° F. |
|---|---|
| 0.42 | 1,180 |
| 0.70 | 1,135 |
| 1.00 | 1,100 | to determine a first measured temperature range (i.e. 1,100–1,180° F.) for the strip 12 with a first temperature error range (i.e. ±40° F.).

Simultaneously, the lead sulfide (emittance-correcting) detector 38 measures the temperature of the strip 12 with a second range of stepped emittance factors in the range from the second predetermined emittance factor (i.e. 0.25 to 2.00) as shown in table II below:

TABLE II

| Emittance Setting | Temperature Reading, ° F. |
|---|---|
| 0.25 | 1,290 |
| 0.40 | 1,190 |
| 0.50 | 1,130 |
| 0.60 | 1,090 |
| 0.70 | 1,080 |
| 0.80 | 1,065 |
| 0.90 | 1,035 |
| 1.00 | 1,018 | to determine a range of reflected emittance factors (i.e. 0.42 to 0.58) corresponding to the first measured temperature range (i.e. 1,100° to 1,180° F.).

These reflected emittance factors (i.e. 0.42 to 0.58) indicate which one half-portion of the half-portions of the emittance factors in table I defined by the first predetermined emittance factor (i.e. 0.42) and the midpoint (i.e. 0.70) between the first predetermined emittance factor (i.e. 0.42) and the midpoint (i.e. 0.70) between the first predetermined emittance factor (i.e. 0.42) and 1.00 and the midpoint (i.e. 0.70) and 1.00 of the first range of stepped emittance factors (i.e. 0.42 to 1.00) in which the desired adjusted emittance factor lies.

Additionally, the location of the adjusted emittance factor (i.e. 0.42 to 0.58) in the lower half range (less than 0.63 of possible emittance factors for emittance-correcting detector 38 indicates that the adjusted emittance factor for temperature-measuring detector 36 should also be in its lower half range, i.e., between 0.42 and 0.70. Thus an adjusted emittance factor of 0.56 for temperature-measuring detector 36 will reduce the error to ±22.5° F. (between 1,235° and 1,180° F).

The silicon cell (temperature-measuring) detector 36 is accordingly set at the midpoint (i.e. 0.56) of the lower half portion (i.e. 0.42 to 0.70) as the adjusted emittance factor to measure the temperature of the strip 12 with a minimum range of temperature error (i.e. ±22.5° F.).

Accordingly it will be understood by those skilled in the art that an improved method is contemplated.

METHOD

The method includes the steps of directing a portion or one wavelength band of the combined thermal radiation to a body-temperature-measuring pyrometer 36 having a high temperature to emittance factor ratio sensitivity and a first predetermined body emittance factor (i.e. about 0.42 for the body 12 as determined for the body 12 by the ratio method and the remainder of the combined thermal radiation to an emittance-correcting pyrometer 38 having a lower temperature to emittance factor ratio sensitivity than the body-temperature-measuring pyrometer 36 and a second predetermined body emittance factor (i.e. about 0.25 ) for the body 12 as determined for the body 12 by the ratio method; measuring the temperature of the body 12 with a first range of stepped emittance factors in the range from the first predetermined body emittance factor (i.e. about 0.42) to 1.00 to determine a first measured temperature range (i.e. about 1,100°–1,180° F.) for the body 12 with a first temperature error range (i.e. about ±40° F.) and measuring the temperature of the body 12 with a second range of stepped emittance factors in the range from the second predetermined emittance factor (i.e. about 0.25 to 1.00) to determine a range of second emittance factors (i.e. about 0.42 to 0.58) corresponding to the first measured temperature range (i.e. about 1,100°–1,180° F.). The range of second emittance factors (i.e. about 0.42–0.58) indicates which one half portion of the half portions defined by the first predetermined emittance factor (i.e. about 0.42) and the midpoint (i.e. about 0.70 between the first predetermined emittance factor (i.e. about 0.40) and 1.00 and the midpoint (i.e. about 0.70) and 1.00 of the first range of stepped emittance factors (i.e. about 0.42–1.00) in which an adjusted emittance factor (i.e. about 0.56) lies. Also included are the steps of setting the body temperature pyrometer 36 at the midpoint (i.e. about 0.56) of the one half-portion as such adjusted emittance factor, and measuring the temperature of the body 12 with the minimum range of temperature error (i.e. about ±22.5° F.).

SUMMARY OF THE ACHIEVEMENT OF THE OBJECTS OF THE INVENTION

It will be recognized by those skilled in the art that the objects of this invention have been achieved by providing an improved apparatus 24 for and method of accurately measuring the temperature of a body 12 in the presence of reflected radiation from walls 18 of a furnace 14 at a temperature lower than the temperature of the body 12, which apparatus 24 and method compensate for reflected thermal radiation from he walls 18a of the furnace 14 and accurately measure the temperature of the body 12 with the minimum temperature error.

While in accordance with the patent statutes preferred and alternative of this invention have been illustrated and described in detail, it is to be particularly understood that the invention is not limited thereto or thereby.

I claim:
1. In combination:
   a. furnace means having walls which define a heating cavity,
   b. a body disposed in said heating cavity,
   c. heating means associated with said furnace means for heating said body to a predetermined temperature, and
   d. apparatus communicating with said heating cavity for determining the proper emittance factor for said apparatus for the combined thermal radiation from said body and the reflected thermal radiation from said walls so that said apparatus will measure the temperature of said body with a minimum range of temperature error, said apparatus having:
      1. sight tube means disposed in one of said walls and in registry with said body,
      2. a body-temperature-measuring pyrometer having a body-temperature-measuring sensor and a recording means, said body-temperature-measuring sensor 2 having a high temperature to emittance factor ratio sensitivity and being disposed in said sight tube means,
         a. said indicating body-temperature-measuring pyrometer having a first predetermined body emittance factor for said body determined for said body by the ratio method,
      3. an emittance-correcting pyrometer having an emittance-correcting sensor connected to said recording means, said emittance-correcting sensor having a temperature to emittance factor ratio sensitivity than said body-temperature-measuring sensor and being disposed adjacent said body-temperature-measuring pyrometer in said sight tube means.
         a. said emittance-correcting pyrometer having a second predetermined emittance factor for said body determined for said body by the ratio method,
      4. mirror means in said sight means for directing a portion of said combined thermal radiation to said body temperature measuring pyrometer and another portion of said combined thermal radiation to said emittance-correcting pyrometer,
      5. said body temperature pyrometer being operable to measure the temperature of said body with a first range of stepped emittance factors in the range from said first predetermined body emittance factor to 1.00 to determine a first indicated temperature range for said body with a first temperature error range,
      6. said emittance-correcting pyrometer being operable to measure the temperature of said body with a second range of stepped emittance factors in the range from said second predetermined emittance factor to 1.00 to determine an indicating range of reflected emittance factors corresponding to said first indicated temperature range,
         a. said range of reflected emittance factors indicating in which one half-portion of the range of emittance factors defined by said first predetermined emittance factor an adjusted emittance factor lies,
      7. said body temperature pyrometer being set at the midpoint of said one half-portion of said first range of emittance factors as such adjusted emittance factors to measure the temperature of said body with said minimum range of temperature error.

2. Apparatus for determining the proper emittance factor for said apparatus for the combined thermal radiation from a body, disposed in a heating cavity defined by the walls of a furnace means and heated to a predetermined temperature by heating means associated with said furnace means, and the reflected thermal radiation from said walls so that said apparatus will measure the temperature of said body with a minimum range of temperature error, said apparatus having:
   a. sight tube means disposed in one of said walls and in registry with said body,
   b. a body-temperature-measuring pyrometer having a body-temperature-measuring sensor and a recording means, said body-temperature-measuring sensor a high temperature to emittance factor ratio sensitivity and being disposed in said sight tube means,
   1. said body-temperature-measuring pyrometer having a first predetermined for said body emittance factor for said body determined for said body by the ratio method,
c. an emittance-correcting pyrometer having an emittance-correcting sensor connected to said recording means, said emittance-correcting sensor; having a lower temperature to emittance factor ratio sensitivity than said body temperature measuring sensor, and being disposed adjacent said body-temperature-measuring pyrometer in said sight tube means,
   1. said emittance-correcting measuring pyrometer having a second predetermined emittance factor for said body determined for said body by the ratio method,
d. mirror means in said sight tube means for directing a portion of said combined thermal radiation to said body-temperature-measuring pyrometer and another portion of said combined thermal radiation to said reflected emittance measuring pyrometer,
e. said body temperature pyrometer being operable to measure the temperature of said body with a first range of stepped emittance factors in the range from said first predetermined body emittance factor to 1.00 to determine a first indicated temperature range for said body with a first temperature error range,
f. said emittance-correcting pyrometer being operable to measure the temperature of said body with a second range of stepped emittance factors in the range from said second predetermined emittance factor to 1.00 to determine an indicating range of reflected emittance factors corresponding to said first indicated temperature range,
   1. said indicating range of reflected emittance factors indicating in which one half-portion of the half-portions defined by said first predetermined emittance factor and the midpoint between said first predetermined emittance factor and 1.00 and said midpoint and 1.00 of said first range of stepped emittance factors in which an adjusted emittance factor lies,
g. said body temperature pyrometer being set at the midpoint of said one half-portion of said first range of emittance factors, as such adjusted emittance factor to measure the temperature of said body with said minimum range of temperature error.

3. The method of determining a low error emittance factor for a radiation pyrometer for the combined thermal radiation from a body, disposed in a heating cavity defined by the walls of a furnace means and heated to a predetermined temperature by heating means associated with said furnace means, and the reflected thermal radiation from said walls to measure the temperature of said body with a minimum range of temperature error, said method including the steps of:
a. directing a portion of said combined thermal radiation to a body-temperature-measuring pyrometer having a high temperature to emittance factor ratio sensitivity and a first predetermined body emittance factor for said body as determined for said body by the ratio method and another portion of said combined thermal radiation to an emittance-correcting pyrometer having a lower temperature to emittance factor ratio sensitivity than said body-temperature-measuring pyrometer, and a second predetermined body emittance factor for said body as determined for said body by the ratio method,
b. measuring the temperature of said body by said body-temperature-measuring pyrometer with a first range of stepped emittance factors in the range from said first predetermined body emittance factor to 1.00 to determine a first indicated temperature range for said body with a first temperature error range,
c. measuring the temperature of said body by said emittance-correcting pyrometer with a second range of stepped emittance factors in the range from said second predetermined emittance factor to 1.00 in order to determine a range of reflected emittance factors corresponding to said first indicated temperature range,
   1. said indicating range of reflected emittance factors indicating which half portion of the range of emittance factors defined by said first predetermined emittance factor and the midpoint between said first predetermined emittance factor and 1.00 and said midpoint and 100 of said first range of stepped emittance factors in which an adjusted emittance factor lies,
d. setting said body temperature pyrometer at the midpoint of said one half-portion of said first range of stepped emittance factors as such adjusted emittance factor, and
e. measuring the temperature of said body with said minimum range of temperature error.

4. The apparatus recited in claim 2 and having chopping means ahead of said mirror means and operating at a fixed frequency for periodically interrupting the combined thermal radiation.

5. The apparatus recited in claim 4 wherein said body temperature measuring sensor generates first alternating electrical signals.

6. The apparatus recited in claim 5 and having a first preamplifier means connected to said body-temperature-measuring detector for amplifying said first alternating electrical signals.

7. The apparatus recited in claim 5 and having first filter means for filtering said first alternating electrical signals.

8. The apparatus recited in claim 4 wherein said reflected emittance correcting sensor generates second alternating electrical signals.

9. The apparatus recited in claim 8 and having a second preamplifier means connected to said reflected emittance-correcting detector for amplifying said second alternating electrical signals.

10. The apparatus recited in claim 8 and having second filter means for filtering said second alternating electrical signals.

11. The method recited in claim 3 and including the step of chopping said combined thermal radiation.

12. The method recited in claim 11 and including the step of producing first alternating electrical signals from said body temperature measuring detector.

13. The method recited in claim 12 and including the step of amplifying said first alternating electrical signals.

14. The method recited in claim 12 and including the step of recording said first alternating electrical signals.

15. The method recited in claim 12 and including the step of filtering said first alternating electrical signals.

16. The method recited in claim 11 and including the step of producing second alternating electrical signals from said reflected emittance-correcting pyrometer.

17. The method recited in claim 16 and including the step of amplifying said second alternating electrical signals.

18. The method recited in claim 16 and including the step of recording said second alternating electrical signals.

19. The method recited in claim 16 and including the step of filtering said second alternating electrical signals.

UNITED STATES PATENT OFFICE
CERTIFICATE OF CORRECTION

Patent No. 3,610,592  Dated October 5, 1971

Inventor(s) Thomas P. Murray

It is certified that error appears in the above-identified patent and that said Letters Patent are hereby corrected as shown below:

Column 4, line 31, "$10^{116}$" should read -- $10^{-16}$ -- ; line 32, "$10^{12}$" should read -- $10^{-2}$ -- ; line 49, "$aT^1$" should read -- $aT^n$ --; same line, "$Tl^{11}$" should read -- $T^{n-1}$ -- . Column 5, line 69, after "(1", insert -- ) -- . Column 6, line 74, delete "(i.e. 0.42)"; also delete line 75. Column 7, line 1, delete "emittance factor"; line 6, after "0.63" insert -- ) -- ; line 12, change "1,235%" to read -- 1,135° -- ; line 49, after "0.70", insert -- ) -- ; line 69, change "he" to -- the -- . Column 8, line 18, delete "2"; line 21, delete "indicating"; line 28, before "temperature", insert -- lower -- ; line 54, after "said", insert -- indicating -- ; line 75, after "sensor", insert -- having -- . Column 9, line 4, delete "for said"; line 9, after "sensor", delete ";" . Column 10, line 10, before "range", delete "a" and insert -- an indicating -- ; line 17, "100" should read -- 1.00 -- .

Signed and sealed this 14th day of November 1972.

(SEAL)
Attest:

EDWARD M. FLETCHER, JR.
Attesting Officer

ROBERT GOTTSCHALK
Commissioner of Patents